United States Patent
Kanamaru

[11] Patent Number: 6,142,126
[45] Date of Patent: Nov. 7, 2000

[54] FUEL SUPPLY APPARATUS

[75] Inventor: Shigeki Kanamaru, Tokyo, Japan

[73] Assignee: Mitsubishi Denki Kabushiki Kaisha, Tokyo, Japan

[21] Appl. No.: 09/355,845

[22] PCT Filed: Dec. 8, 1997

[86] PCT No.: PCT/JP97/04496

§ 371 Date: Aug. 5, 1999

§ 102(e) Date: Aug. 5, 1999

[87] PCT Pub. No.: WO99/30027

PCT Pub. Date: Jun. 17, 1999

[51] Int. Cl.[7] .................................................. F02M 37/04
[52] U.S. Cl. ............................................................. 123/509
[58] Field of Search ................................. 123/509, 457, 123/458, 514, 510

[56] References Cited

U.S. PATENT DOCUMENTS

| | | | |
|---|---|---|---|
| 4,651,701 | 3/1987 | Weaver | 123/509 |
| 5,040,954 | 8/1991 | Iwai | 123/509 |
| 5,782,223 | 7/1998 | Yamashita et al. | 123/509 |
| 5,785,032 | 7/1998 | Yamashita et al. | 123/509 |

FOREIGN PATENT DOCUMENTS

| | | |
|---|---|---|
| 8-210212 | 8/1996 | Japan . |
| WO96/23967 | 8/1996 | WIPO . |

*Primary Examiner*—Thomas N. Moulis
*Attorney, Agent, or Firm*—Sughrue, Mion, Zinn, Macpeak & Seas, PLLC

[57] ABSTRACT

A fuel supplying apparatus comprising a fuel pump 4 disposed within a fuel tank 1 for pumping fuel to an injector, a pressure regulator 6 for discharging an excess amount of fuel out of the fuel from the fuel pump 4 into the fuel tank 1 as an excess fuel, a fuel filter 5 disposed within a flow path connected between the fuel pump 4 and the pressure regulator 6 upstream of the pressure regulator 6 and having a filter element 12 accommodated within an electrically insulating housing 13 for filtering the fuel discharged from said fuel pump 4, characterized by a grounding device comprising an electrically conductive protector 24 or an electrically conductive member 25 for providing an earth to the filter element 12, whereby an electrostatic electricity generated while the fuel is passing through the filter element can be ensured to be dissipated, allowing a stable fuel supply.

6 Claims, 8 Drawing Sheets

FUEL SUPPLY APPARATUS

TECHNICAL FIELD

This invention relates to a fuel supplying apparatus for supplying pressurized fuel to injectors injecting the fuel into an internal combustion engine.

BACKGROUND ART

FIGS. 7 and 8 illustrate a conventional fuel supplying apparatus disclosed in International Publication No. WO96/23967, FIG. 7 being a sectional side view and the FIG. 8 being a plan view. In these figures, it is seen that a cover 3 for closing an opening portion 2 of a fuel tank 1 has a fuel pump 4, a fuel filter 5, a pressure regulator 6, a fuel level gauge 7, an electric connector 8 and a discharge pipe 9 which are functional components of the fuel supply system assembled thereon as an integral unit. In the fuel tank 1 made of metal or synthetic resin, the opening portion 2 is formed. For closing the opening portion 2, the cover made of electrically insulating synthetic resin is provided. Between the cover 3 and the fuel tank 1 a gasket 10 is disposed on sealing therebetween.

The fuel filter 5 is composed of a filter element 12 made of paper accommodated within a housing 11. The cover 3 is one part of the housing 11 and the fuel filter 5 is suspended from the cover 3. The housing 11 comprises the cover 3 and the lower housing 13, which is electrically conducting because it is molded with a synthetic resin material in which an electrically conductive material such as carbon fibers or carbon powders is mixed. The cover 3 and the lower housing 13 are liquid-tightly welded together over the entire circumference at an interface portion 14 and the filter element 12 is inserted within the inner space.

At the upper inner circumference of the housing 11 of the fuel filter 5, an inlet pipe 5 as a fuel inlet is disposed and is connected to a discharge pipe 16 of the fuel pump 4. A pipe 17 (shown by dot-and-dash lines) defining a first fuel outlet out of the two fuel outlets of the housing 11 extends upwardly from the lower end of the lower housing 13 along the axial direction. The pipe 17 is communicated with the discharge pipe 9 disposed in the cover 3 to define a fuel passage 18 for supplying fuel filtered through the fuel filter 5 to the injectors for the engine. A return pipe 19 defining a second fuel outlet is disposed at the lower portion of the lower housing 13 and is connected to the pressure regulator 6.

The electrical connector 8 shown in FIG. 8 is molded integrally with the cover 3 by directly insert-molding a plurality of terminal pins 8a within the electrically insulating resin material of the cover 3. The terminal pins 8a of the electrical connector 8 are connected at the outside of the fuel tank 1 to an electric source and a control unit (not shown). Also, within the fuel tank 1 shown in FIG. 7, they are connected through unillustrated lead wires to an electrical connector portion 20 of the fuel pump 4 for supplying electric power to the motor of the fuel pump 4 and also connected through unillustrated lead wires to the fuel level gauge 7 (shown in FIG. 8) for transmitting an electric signal indicative of the fuel level.

In the fuel supplying apparatus having the above-described structure, when an electric power is supplied to the fuel pump 4 through the electrical connector 8 and the electrical connector portion 20, the fuel pump 4 sucks the fuel through the filter 21 to discharge it from the discharge pipe 16. The fuel flows through a flow path 22 defined between the lower housing 13 and the cover 3 in the direction shown by an arrow A. The fuel then flows through the housing 11 from top to bottom and while doing so the fuel flows through the filter element 12 to be filtered with respect to dust or the like. As for the fuel passed through the filter element 12 and arrived at a bottom space 23 of the housing 11, one portion of it is returned to the fuel tank 1 by the pressure regulator 6 to regulate the pressure of the fuel and the remaining major portion of the fuel is supplied through the discharge pipe 9 to the injectors (not shown) of the fuel injection apparatus mounted to the engine.

During the passage of the fuel through the filter element 12 made of paper, electrostatic electricity is generated due to the friction between the fuel and the filter element 12. This electricity is dissipated from the lower housing 13 made of an electrically conductive resin through water within the fuel to the exterior of the fuel tank 1.

In the conventional fuel supplying apparatus as above described, the electrostatic electricity generated by the friction between the fuel and the filter element 12 during the passage of the fuel through the paper filter element 12 is dissipated from the lower housing 13 made of an electrically conductive resin. However, with this structure, a contact between the lower housing 13 and the fuel tank 1 during the dismounting of the fuel filter 5 may cause a sparking electric discharge therebetween. This sparking electric discharge causes the lower housing 13 to deteriorate, generating fuel leakage through the deteriorated portion from the interior of the lower housing 13 to the interior of the fuel tank 1, degrading the filtering ability of the fuel filter 5 and decreasing the pressure of the fuel to an extent that the pressurized fuel cannot be supplied.

DISCLOSURE OF THE INVENTION

The present invention has been made to solve the above-discussed problems and has as its object the provision of a fuel supplying apparatus in which an electrostatic electricity generated while the fuel is passing through the paper filter element can be ensured to be dissipated, generating no deterioration of the fuel filter and which can stably supply the fuel.

According to the present invention, the provision is made of a grounding device for taking the grounding earth from the filter element.

Also, the filter element may be closely contacted by an electrically conductive member, and grounding terminals of a protector and an electrical connector may be electrically connected through the electrically conductive member.

Also, the filter element may be made electrically conductive by mixing an electrically conductive material, and filter element and a grounding terminal of an electrical connector may be electrically connected through an electrically conductive member.

Also, a housing of the filter element may have an intermediate terminal secured thereon, and one end of the intermediate terminal may be in abutment with a protector of the filter element and the other end of the intermediate terminal may be connected to a grounding terminal of an electrical connector.

Also, a housing of the filter element may have an intermediate terminal secured thereon, and one end of the intermediate terminal may be electrically connected through a grounding spring to a protector of the filter element and the other end of the intermediate terminal may be connected to a grounding terminal of an electrical connector.

Further, the apparatus may comprise an intermediate terminal secured to the inner wall portion of the housing of the fuel filter, a contact pawl formed on a protector of an filter element and engaging one end of the intermediate terminal and a contact piece connected to a minus terminal of the fuel pump and engaging the other end of the intermediate terminal, the contact piece being connected to a grounding terminal of an electrical connector.

BEST MODES FOR CARRYING OUT THE INVENTION

Figure 1:
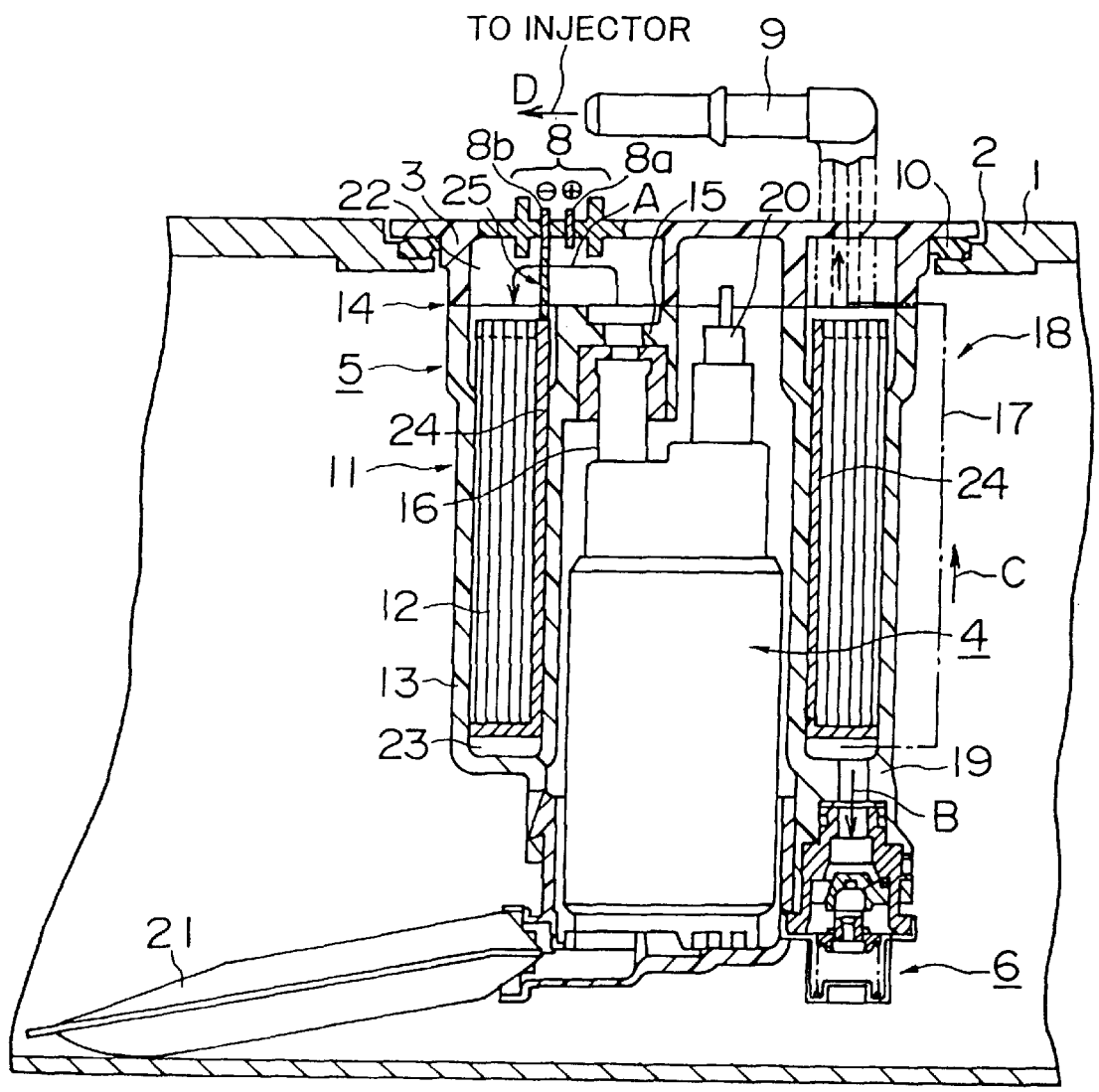
FIG. 1 is a sectional side view showing one embodiment of the fuel supplying apparatus of the present invention.
Figure 2:
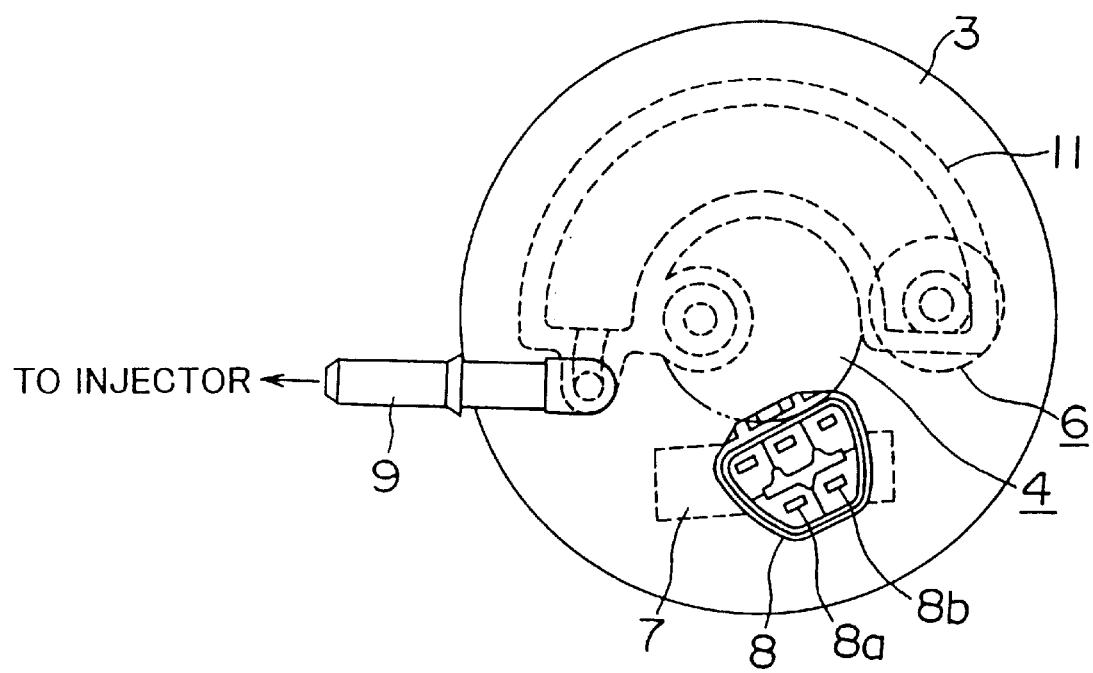
FIG. 2 is a plan view showing another embodiment of the fuel supplying apparatus of the present invention.

FIGS. 1 and 2 are views showing one embodiment of the fuel supplying apparatus of the present invention, FIG. 1 being a sectional side view and FIG. 2 being a plan view. In these figures, it is seen that a cover 3 for closing an opening portion 2 of a fuel tank 1 has a fuel pump 4, a fuel filter 5, a pressure regulator 6, a fuel level gauge 7 (see FIG. 2), an electric connector 8 and a discharge pipe 9 which are functional components of the fuel supply system assembled thereon as an integral unit. In the fuel tank 1 made of metal or synthetic resin, the opening portion 2 is formed. For closing the opening portion 2, the cover made of electrically insulating synthetic resin is provided. Between the cover 3 and the fuel tank 1 a gasket 10 is disposed on sealing there between.

The fuel filter 5 is composed of a filter element 12 made of paper accommodated within a housing 11. The cover 3 is one part of the housing 11 and the fuel filter 5 is suspended from the cover 3. The filter element 12 has closed contacted thereto a protector 24 made of metal or an electrically conductive resin or the like and the protector 24 and a grounding terminal 8b (shown in FIG. 2) within the electrical connector 8 which will be described later are connected by an electrically conductive member 25. The protector 24 and the electrically conductive member 25 constitute a grounding device.

The housing 11 comprises the cover 3 which is an upper housing made of an electrically insulating resin and a lower housing 13 made of a synthetic resin. The cover 3 arid the lower housing 13 are liquid-tightly welded together over the entire circumference at an interface portion 14 and the filter element 12 is inserted within the inner, space.

At the upper inner circumference of the housing 11 of the fuel filter 5, an inlet pipe 5 as a fuel inlet is disposed and is connected to a discharge pipe 16 of the fuel pump 4. A pipe 17 (shown by dot-and-dash lines) defining a first fuel outlet out of the two fuel outlets of the housing 11 extends upwardly from the lower end of the lower housing 13 along the axial direction. The pipe 17 is communicated with the discharge pipe 9 disposed in the cover 3 to define a fuel passage 18 for supplying fuel filtered through the fuel filter 5 to the injectors for the engine. A return pipe 19 defining a second fuel outlet is disposed at the lower portion of the lower housing 13 and is connected to the pressure regulator 6.

The electrical connector 8 shown in FIG. 2 is molded integrally with the cover 3 by directly insert-molding a plurality of terminal pins, such as plus side source terminal 8a, a minus side grounding terminal 8b and the like, within the electrically insulating resin material of the cover 3. The terminal pins 8a, 8b of the electrical connector 8 are connected at the outside of the fuel tank 1 to an electric source and a control unit (not shown) through un unillustrated connector. Also, within the fuel tank 1, they are connected through unillustrated lead wires to an electrical connector portion 20 of the fuel pump 4 for supplying electric power to the motor of the fuel pump 4 and are also connected through unillustrated lead wires to the fuel level gauge 7 (shown in FIG. 2) for transmitting an electric signal indicative of the fuel level.

In the fuel supplying apparatus having the above-described structure, when an electric power is supplied to the fuel pump 4 through the electrical connector 8 and the electrical connector portion 20, the fuel pump 4 sucks the fuel through the filter 21 to discharge it from the discharge pipe 16. The fuel flows through a flow path 22 defined between the lower housing 13 and the cover 3 in the direction shown by an arrow A. The fuel then flows through the housing 11 from top to bottom as viewed in FIG. 1 and while doing so the fuel flows through the filter element 12 to be filtered with respect to dust or the like. As for the fuel passed through the filter element 12 and arrived at a bottom space 23 of the housing 11, one portion of it flows in the direction shown by an arrow B and is returned to the fuel tank 1 by the pressure regulator 6 to regulate the pressure of the fuel and the remaining portion of the fuel flows in the direction shown by an arrow C and is supplied through the pipe 17 and the discharge pipe 9 to flow in the direction shown by an arrow D into the injectors of the fuel injection apparatus mounted to the engine.

During the passage of the fuel through the filter element 12, the electrostatic electricity generated due to the heavy friction between the fuel and the filter element 12 is dissipated to the grounding terminal 8b of the electrical connector 8 through the protector made of an electrically conductive material such as metal or an electrically conductive resin and the electrically conductive member 25.

According to this embodiment, the electrostatic electricity generated at the filter element 12 is dissipated through the protector 24 and the conducting member 25 which are the grounding device to the grounding terminal 8b of the electrical connector 8, alleviating the deteriorating of the lower housing 13, generating no fuel leakage into the interior of the fuel tank 1 due to the deterioration, enabling the stable supply of the fuel into the injectors.

Figure 3:
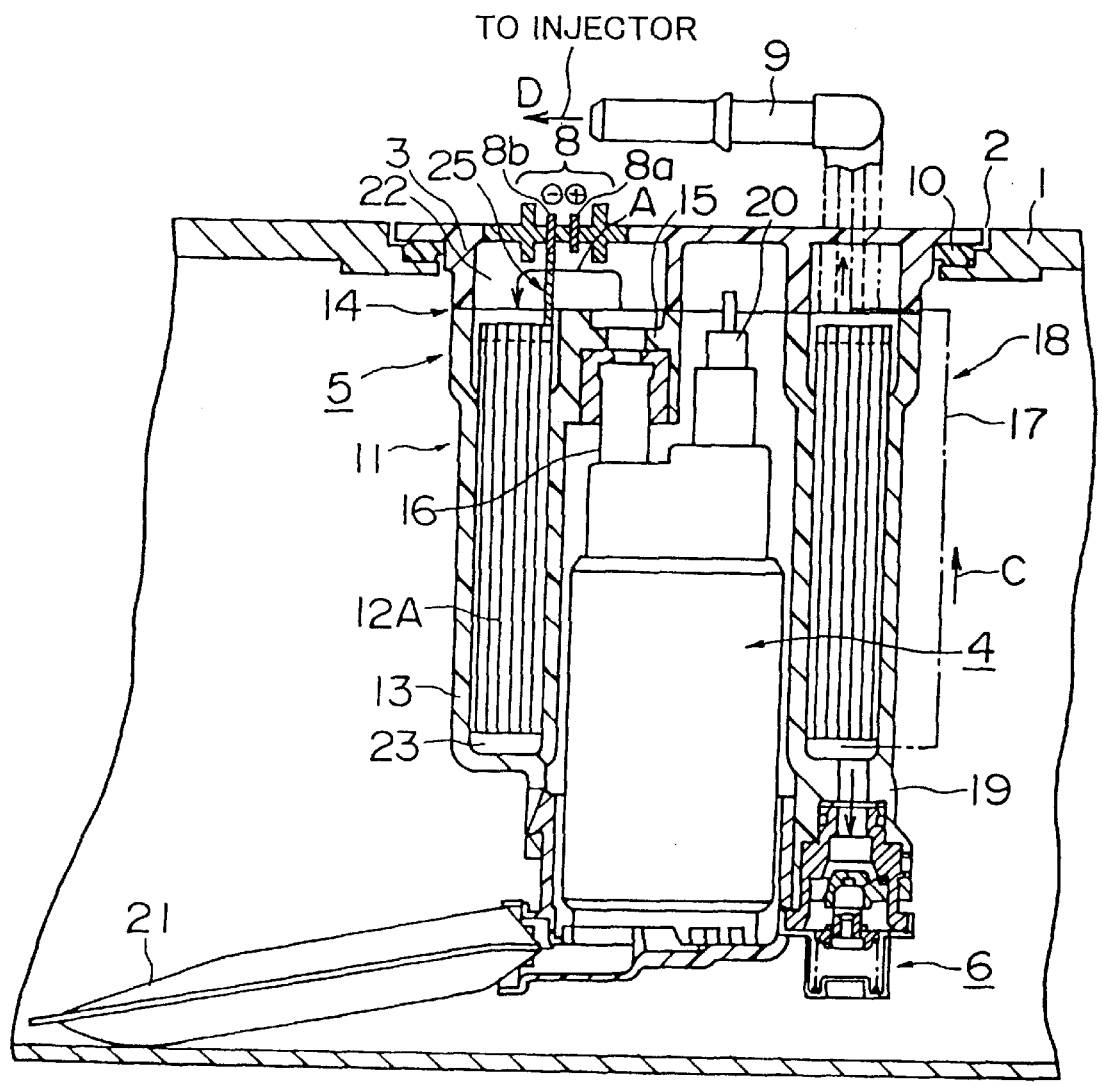
FIG. 3 is a sectional side view showing still another embodiment of the fuel supplying apparatus of the present invention.

In the embodiment shown in FIG. 3, a filter element 12A made electrically conducting by mixing an electrically conductive material such as metal powders, metal fibers, carbon powders, carbon fibers or the like is employed. The electrically conductive filter element 12A is electrically connected to the grounding terminal 8b of the electrical connector 8 through the electrical conducting member 25 which is the grounding device and the protector 24 is not employed. The structure is the same as those shown in FIGS. 1 and 2 in other respects, and it is to be noted that the above-described structure also provides a similar improved electrical grounding property.

Figure 4:
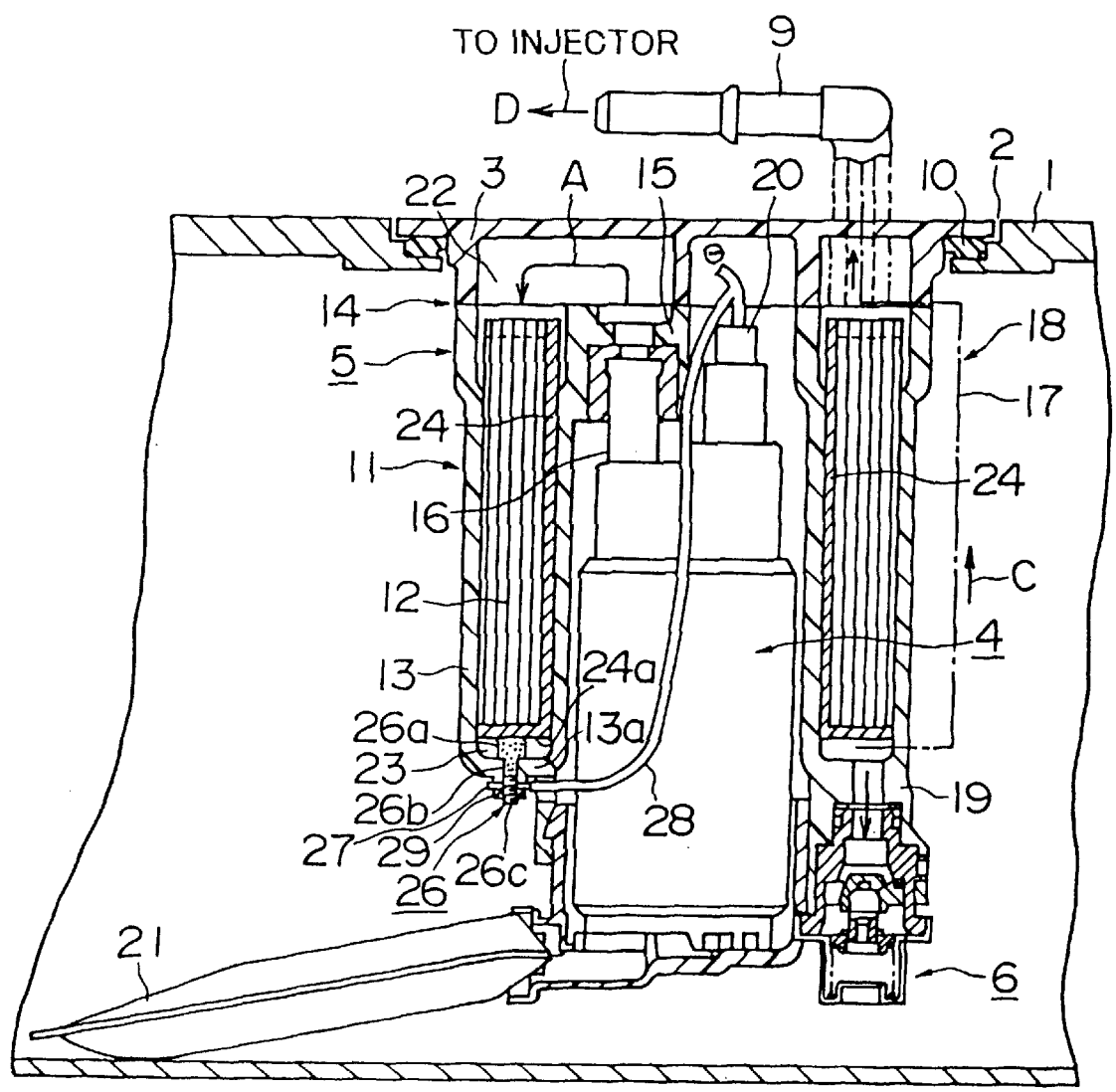
FIG. 4 is a sectional side view showing a further embodiment of the fuel supplying apparatus of the present invention.

FIG. 4 is a sectional side view showing another embodiment of the fuel supplying apparatus of the present invention. In the figure, 26 is an intermediate terminal made of an electrically conductive material and having a head portion 26a of a large diameter and a terminal connecting portion 26b of a small diameter, the terminal connecting portion 26b being integrally and liquid-tightly secured to a bottom portion 13a of the lower housing 13 and has formed a male thread 26c at its tip portion. The top end surface of the head portion 26a is brought into electrical contact with the bottom end surface of the protector 24. 27 is a terminal plate connected to one end of the earth line 28, inserted into the male thread 26c and electrically connected by a nut 29. Also, the other end of the earth line 28 is shunt-connected to the minus side of the electrical connector portion 20 of the fuel pump 4.

According to this embodiment, the electrostatic electricity generated at the filter element 12 is dissipated to the grounding terminal 8b of the electrical connector 8 through the protector 24—the intermediate terminal 26—the terminal plate 27—the lead wire 28—the minus side of the electrical connector portion 20 of the fuel pump 4, whereby no electrostatic electricity is accumulated in the lower housing 13. Therefore, even when the lower housing 13 and the fuel tank 1 are brought into contact with each other during the dismounting of the fuel filter 5, no sparking discharge occurs, alleviating the deteriorating of the lower housing 13, generating no fuel leakage into the interior of the fuel tank 1 due to the deterioration, enabling the stable supply of the fuel into the injectors.

Figure 5:
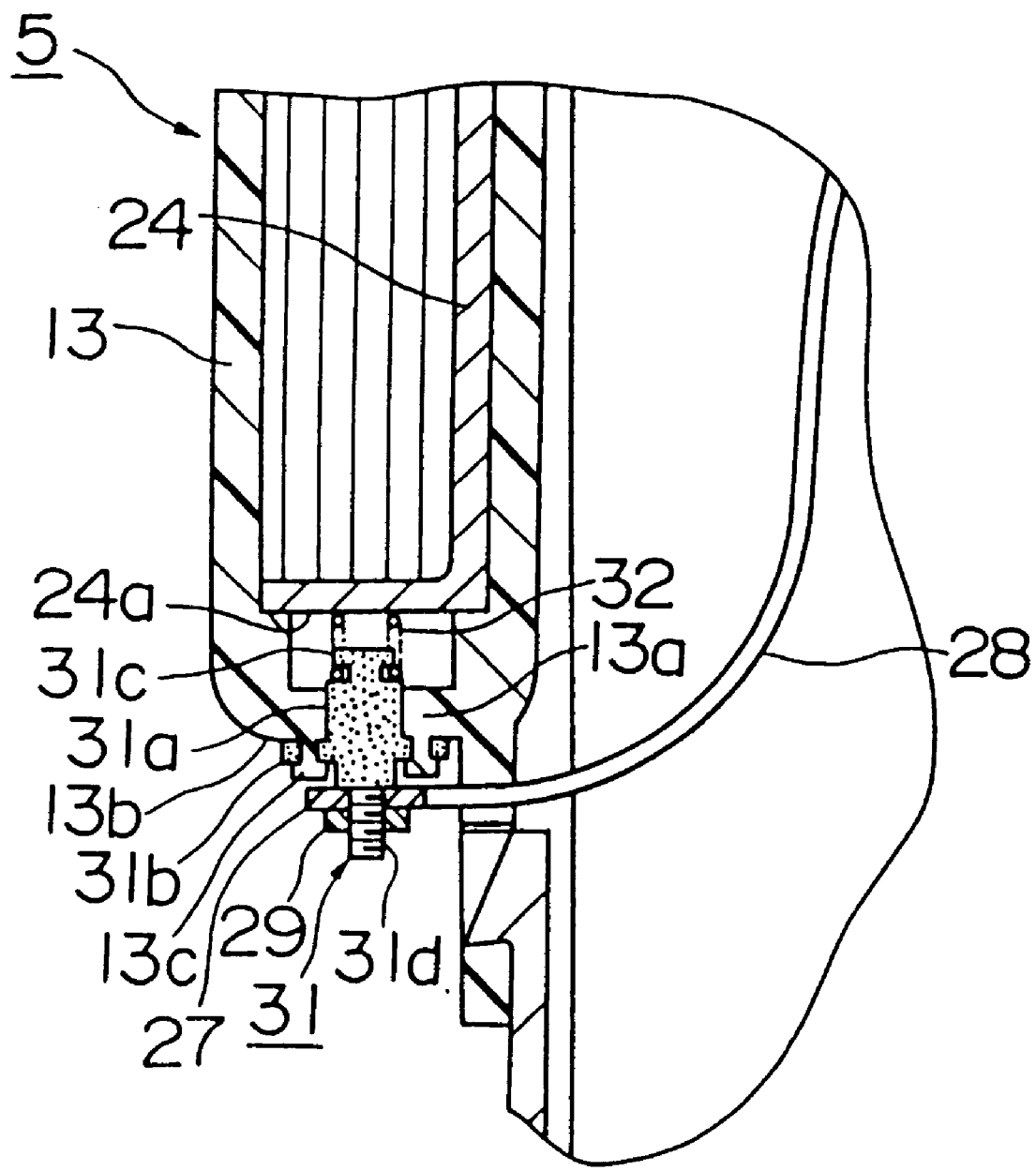
FIG. 5 is a sectional side view showing another embodiment of the fuel supplying apparatus of the present invention.

FIG. 5 is a sectional side view showing the fourth embodiment of the fuel supplying apparatus of the present invention. In the figure, 31 is an intermediate terminal made of an electrically conductive material and having a head portion 31a of a large diameter integrally and liquid-tightly secured to a bottom portion 13a of the lower housing 13, a flange portion 31b brought into abutment with the bottom end surface 13b of the lower housing 13, a spring engaging portion 31c on its one end and a male thread 31d on its the other end. 32 is a grounding spring for electrically connecting the bottom end surface 24a of the protector 24 and the intermediate terminal 31. The flange portion 31b is secured to the housing 13 by softening and spreading by heat calking the tip portion of the projection 13c formed on the bottom end surface 13b of the lower housing 13. 27 is a terminal plate which is, similarly to the embodiment shown in FIG. 4, connected to one end of the earth line 28, placed over the male thread 31d and electrically connected by the nut 29. Also, the other end of the earth line 28 is shunt-connected to the minus side of the electrical connector portion 20 (shown in FIG. 4) of the fuel pump 4.

According to this embodiment, the electrostatic electricity generated at the filter element 12 is dissipated to the grounding terminal 8b of the electrical connector 8 through the protector 24—the grounding spring 32—the intermediate terminal 31—the lead line 28—the terminal plate 27—the minus side of the electrical connector portion 20 of the fuel pump 4, whereby no electrostatic electricity is accumulated in the lower housing 13, so that similar advantageous results to those in the embodiment shown in FIG. 4 can be obtained, and since the electrical contact between the intermediate terminal 31 and the protector 24 is improved because of the function of the grounding spring 32, allowing a wider range of dimensional tolerance.

Figure 6:
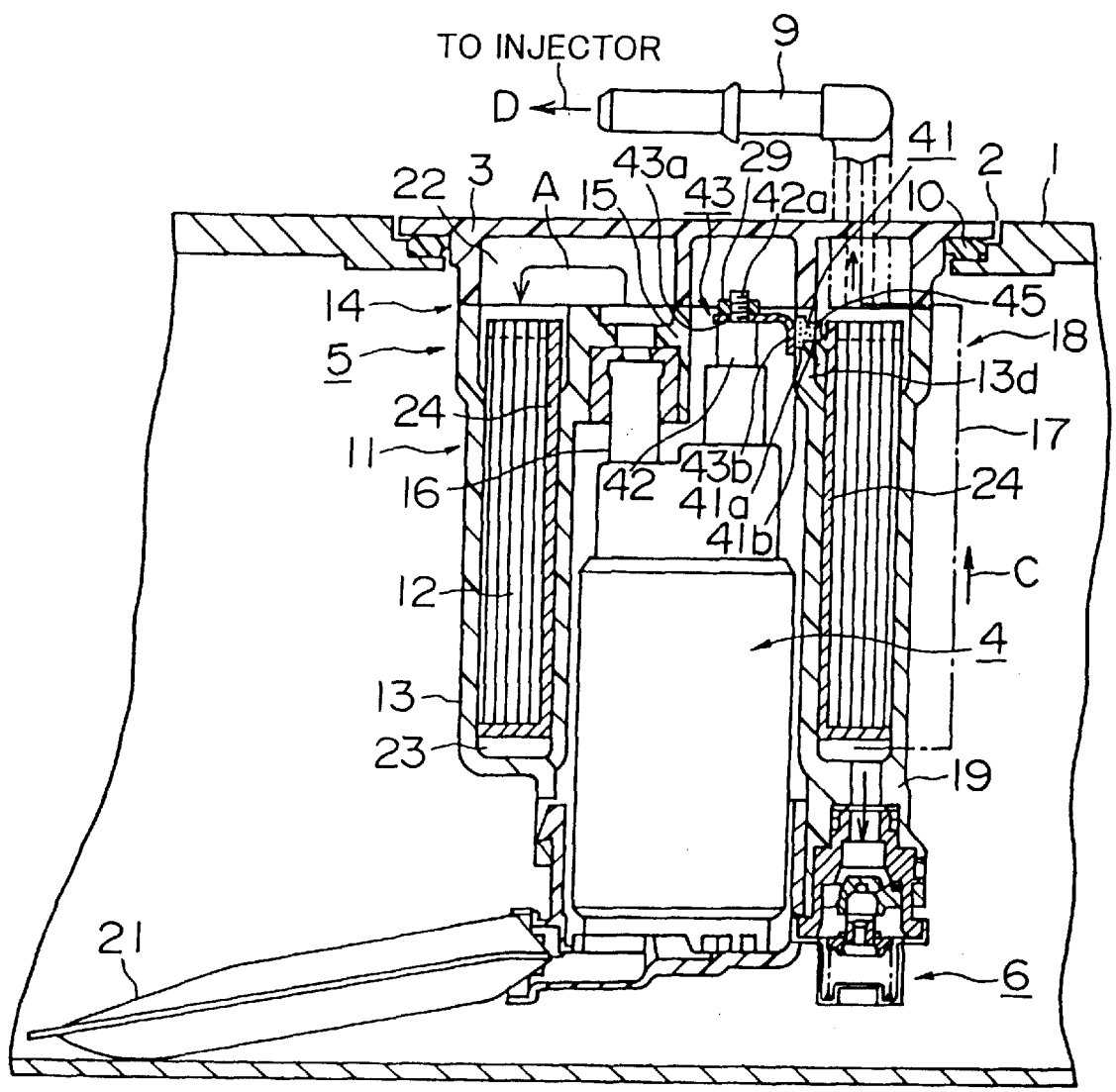
FIG. 6 is a sectional side view showing still another embodiment of the fuel supplying apparatus of the present invention.
Figure 7:
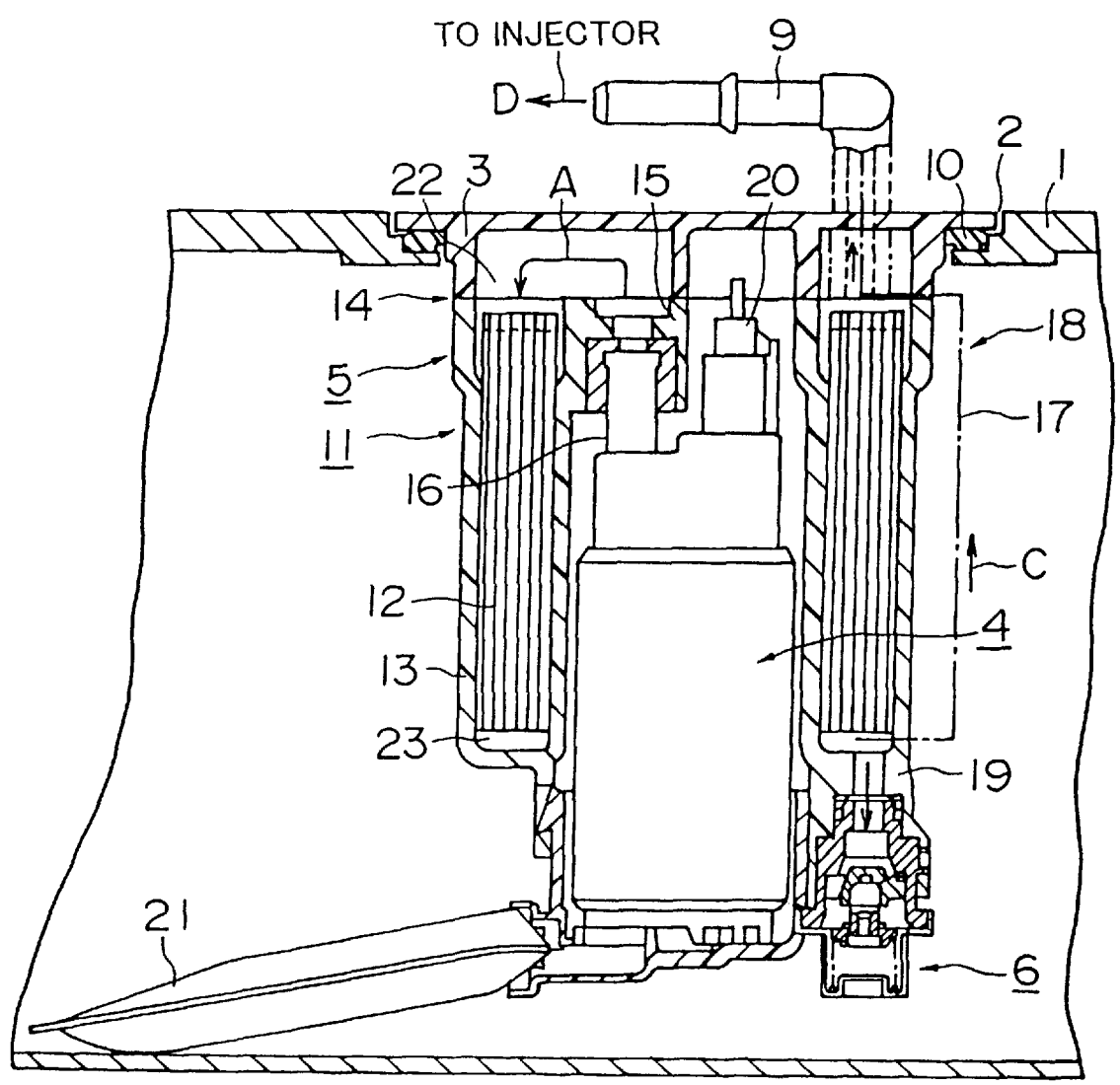
FIG. 7 is a sectional side view showing a conventional fuel supplying apparatus.
Figure 8:
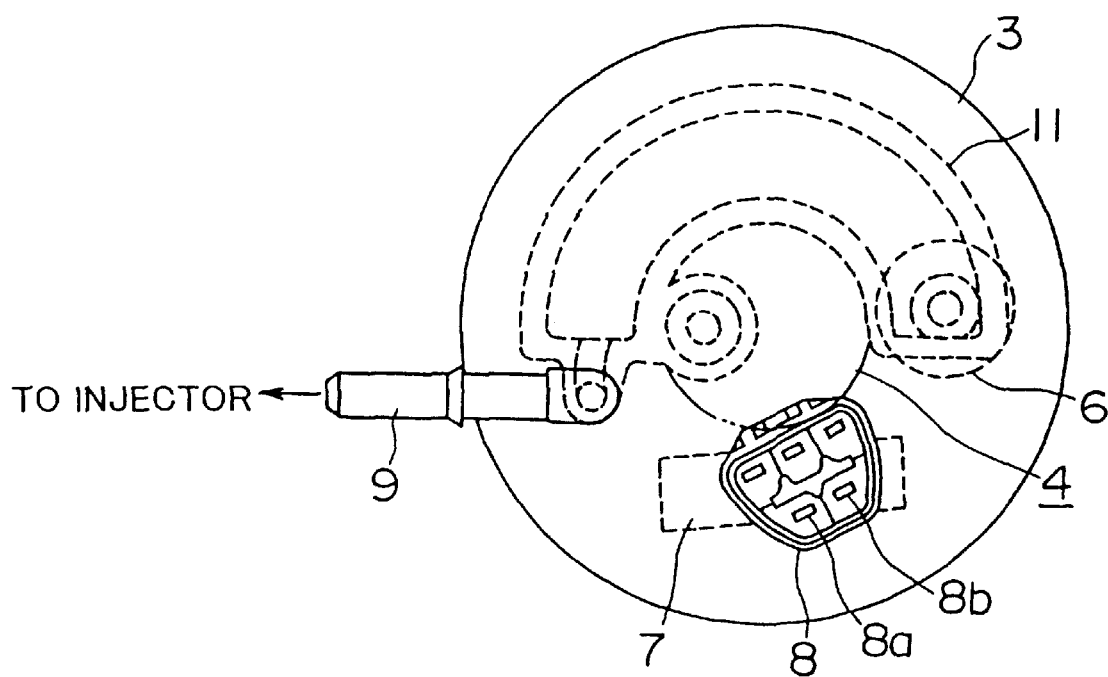
FIG. 8 is a plan view showing the conventional fuel supplying apparatus.

FIG. 6 is a sectional side view showing a still another embodiment of the fuel supplying apparatus of the present invention. In the figure, 41 is an intermediate terminal made of an electrically conductive material and integrally and liquid-tightly secured to the inner wall portion 13d of the lower housing 13 and having a large diameter portion 41a and a small diameter portion 41b. 42 is a minus side pump terminal for supplying an electric power to the fuel pump 4 and having formed at its one end portion a male thread 42a. 43 is a terminal plate having a clamp portion 43a placed over the male thread 42a and Electrically connected by the nut 29 and a contact piece 43b bent downwardly from the camp portion 43a into an L-shape, the contact piece 43b elastically establishing an electrical connection with respect to the large diameter portion 41a of the intermediate terminal 41. 45 is a contact pawl projecting inwardly from one end of the inner circumferential portion of the protector 24, which is elastically brought into electrical contact with the small diameter portion 41b of the intermediate terminal 41.

According to this embodiment, the electrostatic electricity generated at the filter element 12 is dissipated to the grounding terminal 8b of the electrical connector 8 through the protector 24—the contact pawl 45—the intermediate terminal 41—the contact piece of the terminal plate 43—the minus side pump terminal 42 of the fuel pump 4, whereby no electrostatic electricity is accumulated in the lower housing 13, so that similar advantageous results to those in the previous embodiments can be obtained.

APPLICABILITY TO INDUSTRIES

According to the fuel supplying apparatus of the present invention, the provision is made of a grounding device for taking the grounding earth from the filter element, so that an electrostatic electricity generated due to the friction while the fuel is passing through the filter element can be ensured to be dissipated without generating spark discharge, generating no deterioration of the fuel filter and allowing a stable supply of the fuel to the injectors.

Also, the filter element is closely contacted by the protector made of an electrically conductive material, and grounding terminals of the protector and the electrical connector is electrically connected through the electrically conductive member, so that an electrostatic electricity generated due to the friction while the fuel is passing through the filter element can be ensured to be dissipated without generating spark discharge, generating no deterioration of the fuel filter and allowing a stable supply of the fuel to the injectors.

Also, the filter element is made electrically conductive by mixing an electrically conductive material, and the filter element and the grounding terminal of the electrical connector is electrically connected through the electrically conductive member, so that an electrostatic electricity generated due to the friction while the fuel is passing through the filter element can be ensured to be dissipated without generating spark discharge, generating no deterioration of the fuel filter and allowing a stable supply of the fuel to the injectors.

Also, the housing of the filter element is provided with an intermediate terminal secured thereon, and one end of the intermediate terminal is made in abutment with the protector of the filter element and the other end of the intermediate terminal is connected to the grounding terminal of the electrical connector, so that an electrostatic electricity generated due to the friction while the fuel is passing through the filter element can be ensured to be dissipated without generating spark discharge, generating no deterioration of the fuel filter and allowing a stable supply of the fuel to the injectors.

Also, the housing of the filter element is provided with an intermediate terminal secured thereon, and one end of the intermediate terminal is electrically connected through the grounding spring to the protector of the filter element and the other end of the intermediate terminal is connected to the grounding terminal of the electrical connector, so that an electrostatic electricity generated due to the friction while the fuel is passing through the filter element can be ensured to be dissipated without generating spark discharge, generating no deterioration of the fuel filter and allowing a stable supply of the fuel to the injectors.

Further, the apparatus comprises an intermediate terminal secured to the inner wall portion of the housing of the fuel filter, a contact pawl formed on the protector of the filter element and engaging one end of the intermediate terminal and a contact piece connected to a minus terminal of the fuel pump and engaging the other end of the intermediate terminal, the contact piece being connected to the grounding terminal of an electrical connector, so that an electrostatic electricity generated due to the friction while the fuel is passing through the filter element can be ensured to be dissipated without generating spark discharge, generating no deterioration of the fuel filter and allowing a stable supply of the fuel to the injectors.

What is claimed is:

1. A fuel supplying apparatus comprising a fuel pump disposed within a fuel tank for pumping fuel to an injector of an internal combustion engine;
    a pressure regulator disposed within said fuel tank for discharging an excess amount of fuel out of the fuel from said fuel pump into said fuel tank as an excess fuel from a fuel path;
    a fuel filter disposed within a flow path connected between said fuel pump and said pressure regulator upstream of said pressure regulator and having a filter element accommodated within an electrically insulating housing for filtering the fuel discharged from said fuel pump; and
    a grounding device for taking a grounding earth from said filter element.

2. A fuel supplying apparatus as claimed in claim 1, wherein said grounding device comprises a protector made of an electrically conductive material and electrically contacting said filter element and an electrically conductive member for electrically connecting said protector and said grounding terminal of said electrical connector.

3. A fuel supplying apparatus as claimed in claim 1, wherein said filter element having an electrical conductivity due to an electrically conductive material mixed therein, and said grounding device comprising an electrically conductive member for electrically connection said filter element having an electrical conductivity and a grounding terminal of said electrical connector.

4. A fuel supplying apparatus as claimed in claim 1, wherein said grounding device is supported by a housing of said filter element and includes an intermediate terminal having one end electrically contacting with said protector of said filter element and the other end connected to said grounding terminal of said electrical connector.

5. A fuel supplying apparatus as claimed in claim 1, wherein said grounding device is supported by a housing of said filter element and includes an intermediate terminal having one end electrically contacting with said protector of said filter element through a grounding spring and the other end connected to said grounding terminal of said electrical connector.

6. A fuel supplying apparatus as claimed in claim 1, wherein said grounding device comprises a contact pawl formed on a protector of an filter element, an intermediate terminal supported by an inner circumferential wall of said housing of said fuel filter and having one end engaging with said contact pawl and a contact piece engaging the other end of said intermediate terminal and secured and connected to a minus side terminal of said fuel pump and connected to said grounding terminal of said electrical connector.

* * * * *